United States Patent
Alvarez Guevara

(10) Patent No.: US 10,438,593 B2
(45) Date of Patent: Oct. 8, 2019

(54) INDIVIDUALIZED HOTWORD DETECTION MODELS

(71) Applicant: Google LLC, Mountain View, CA (US)

(72) Inventor: Raziel Alvarez Guevara, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/805,753

(22) Filed: Jul. 22, 2015

(65) Prior Publication Data

US 2017/0025125 A1  Jan. 26, 2017

(51) Int. Cl.
| | |
|---|---|
| *G10L 15/00* | (2013.01) |
| *G10L 17/04* | (2013.01) |
| *G10L 15/06* | (2013.01) |
| *G10L 17/08* | (2013.01) |
| *G10L 17/18* | (2013.01) |

(Continued)

(52) U.S. Cl.
CPC ............ *G10L 17/04* (2013.01); *G10L 15/02* (2013.01); *G10L 15/063* (2013.01); *G10L 15/07* (2013.01); *G10L 15/1815* (2013.01); *G10L 17/06* (2013.01); *G10L 17/08* (2013.01); *G10L 17/18* (2013.01); *G10L 17/24* (2013.01);
(Continued)

(58) Field of Classification Search
CPC ....................................................... G10L 15/00
USPC ........ 704/239, 224, 232, 233, 236; 707/269; 709/206, 228; 715/728
See application file for complete search history.

(56) References Cited

U.S. PATENT DOCUMENTS 5,913,192 A * 6/1999 Parthasarathy ......... G10L 17/24
704/244
6,073,096 A   6/2000 Goa et al.
(Continued)

FOREIGN PATENT DOCUMENTS

| CN | 1462995 A | 12/2003 |
|---|---|---|
| CN | 101447185 A | 6/2009 |

(Continued)

OTHER PUBLICATIONS

Chen et al., "Small-footprint keyword spotting using deep neural networks," in Proceedings of IEEE International conference on Acoustics, Speech and Signal Processing (ICASSP), May 2014, pp. 4087-4091.
(Continued)

*Primary Examiner* — Michael C Colucci
(74) *Attorney, Agent, or Firm* — Fish & Richardson P.C.

(57) ABSTRACT

Methods, systems, and apparatus, including computer programs encoded on a computer storage medium, for presenting notifications in an enterprise system. In one aspect, a method include actions of obtaining enrollment acoustic data representing an enrollment utterance spoken by a user, obtaining a set of candidate acoustic data representing utterances spoken by other users, determining, for each candidate acoustic data of the set of candidate acoustic data, a similarity score that represents a similarity between the enrollment acoustic data and the candidate acoustic data, selecting a subset of candidate acoustic data from the set of candidate acoustic data based at least on the similarity scores, generating a detection model based on the subset of candidate acoustic data, and providing the detection model for use in detecting an utterance spoken by the user.

20 Claims, 4 Drawing Sheets

(51) Int. Cl.
*G10L 17/24* (2013.01)
*G10L 15/02* (2006.01)
*G10L 15/18* (2013.01)
*G10L 17/06* (2013.01)
*G10L 15/07* (2013.01)
*G10L 15/08* (2006.01)

(52) U.S. Cl.
CPC .... *G10L 15/075* (2013.01); *G10L 2015/0638* (2013.01); *G10L 2015/088* (2013.01)

(56) References Cited

U.S. PATENT DOCUMENTS

| | | | |
|---|---|---|---|
| 7,203,652 B1* | 4/2007 | Heck | G10L 15/32 704/231 |
| 7,212,613 B2 | 5/2007 | Kim | |
| 7,552,055 B2* | 6/2009 | Lecoeuche | H04M 3/4938 704/270.1 |
| 8,676,904 B2* | 3/2014 | Lindahl | G10L 15/30 709/206 |
| 8,924,219 B1* | 12/2014 | Bringert | G06F 3/04842 704/275 |
| 9,123,330 B1* | 9/2015 | Sharifi | G06F 21/16 |
| 9,378,733 B1* | 6/2016 | Vanhoucke | G10L 15/02 |
| 9,589,564 B2* | 3/2017 | Sharifi | G10L 15/26 |
| 2003/0050783 A1 | 3/2003 | Yoshizawa | |
| 2004/0236573 A1* | 11/2004 | Sapeluk | G10L 17/02 704/224 |
| 2009/0171660 A1* | 7/2009 | Jian | G10L 17/20 704/246 |
| 2009/0319270 A1* | 12/2009 | Gross | G10L 15/22 704/246 |
| 2010/0064047 A1* | 3/2010 | Sullivan | H04L 29/12066 709/228 |
| 2010/0106502 A1* | 4/2010 | Farrell | G07C 9/00158 704/246 |
| 2011/0066634 A1* | 3/2011 | Phillips | G10L 15/22 707/769 |
| 2014/0278435 A1 | 9/2014 | Ganong et al. | |
| 2014/0330563 A1* | 11/2014 | Faians | G06Q 30/0185 704/236 |
| 2014/0358543 A1* | 12/2014 | Chino | G06Q 10/105 704/254 |
| 2015/0019220 A1* | 1/2015 | Talhami | G10L 15/063 704/244 |
| 2015/0112684 A1* | 4/2015 | Scheffer | G10L 17/14 704/257 |
| 2015/0127337 A1* | 5/2015 | Heigold | G10L 15/063 704/232 |
| 2015/0294670 A1* | 10/2015 | Roblek | G10L 17/005 704/232 |
| 2015/0301796 A1* | 10/2015 | Visser | G06F 3/167 715/728 |
| 2016/0189730 A1* | 6/2016 | Du | G10L 21/0272 704/233 |

FOREIGN PATENT DOCUMENTS

| | | |
|---|---|---|
| CN | 101593519 A | 12/2009 |
| CN | 103559881 | 2/2014 |
| JP | 2000-089780 | 3/2000 |
| JP | 2005-107550 | 4/2005 |
| JP | 2013/008200 | 1/2013 |
| WO | WO 2007/111169 | 10/2007 |

OTHER PUBLICATIONS

Prabhavalkar et al., "Automatic gain control and multi-style training for robust small-footprint keyword spotting with deep neural networks," in Proceedings of IEEE International Conference on Acoustics, Speech and Signal Processing (ICASSP), (to appear), 2015, 5 pages.
Variani et al., "Deep neural networks for small footprint text-dependent speaker verification," 2014 IEEE International Conference on Acoustics, Speech and Signal Processing (ICASSP '14), 2014, pp. 4080-4084.
International Search Report and Written Opinion in International Application No. PCT/US2016/038178, dated Aug. 10, 2016, 13 pages.
Jiang et al., "Subword-Dependent Speaker Clustering for Improved Speech Recognition," Oct. 16, 2000, Interspeech, pp. 137-140, XP007010404.
Padmanabhan et al., "Speaker Clustering and Transformation for Speaker Adaptation in Speech Recognition Systems," IEEE Transactions on Speech and Audio Processing, IEEE Service Center, vol. 6, No. 1, Jan. 1, 1998, pp. 71-77, XP011054285.
European Search Report in European Application No. 16179113.2, dated Oct. 4, 2016, 6 pages.
Korean Office Action issued in Korean Application No. 10-2016-0092851, dated Jul. 26, 2017, 7 pages (English Translation).
Japanese Office Action issued in Japanese Application No. 2016-143155, dated Oct. 23, 2017, 8 pages (with English Translation).
Washimi. "Personal Authentication Technology with Increasing Accuracy," Japan, NTS Inc., vol. 1, Nov. 18, 2014, 12 pages (Japanese Language Document) Submitted in conjunction with the JP Office Action (Desig. ID. No. 4) for relevance.
Office Action issued in European Application No. 16186281.8, dated Feb. 5, 2018, 5 pages.
Notice of Allowance issued in Korean Application No. 10-2016-0092851, dated Feb. 26, 2018, 3 pages (with English Translation).
CN Office Action issued in Chinese Application No. 201610586197.0, dated Mar. 1, 2019, 15 pages (with English translation).
JP Office Action issued in Japanese Application No. 2018-061958, dated Mar. 11, 2019, 8 pages (with English translation).

* cited by examiner

INDIVIDUALIZED HOTWORD DETECTION MODELS

TECHNICAL FIELD

This disclosure generally relates to controlling computers using voice commands.

BACKGROUND

A computer may analyze a user's utterance and may perform an action in response. For example, a user may say "DRIVE HOME" and a computer may respond with directions for the user to drive home from their current location.

SUMMARY

In general, an aspect of the subject matter described in this specification may involve a process for generating an individualized hotword detection model. As used by this specification, a "hotword" may refer to a term that wakes a device up from a sleep state or hibernation state, or a term that triggers semantic interpretation on the term or on one or more terms that follow the term, e.g., on voice commands that follow the hotword.

For example, in the utterance "OK COMPUTER, DRIVE HOME," the term "OK COMPUTER," may be a hotword that triggers semantic interpretation on the following term "DRIVE HOME," and the term "DRIVE HOME" may correspond to a voice command for providing directions to the user's home. When the system receives sound corresponding to the utterance "OK COMPUTER, DRIVE HOME," the system may determine that the utterance begins with the hotword, "OK COMPUTER," in response, transcribe the sound, perform semantic interpretation on the transcription of the voice command "DRIVE HOME," and output directions for the user to drive home.

Hotwords may be useful for "always on" systems that may potentially pick up sounds that are not directed to the system. For example, the use of hotwords may help the system discern when a given utterance is directed at the system, as opposed to an utterance that is directed to another individual present in the environment. In doing so, the system may avoid computationally expensive processing, e.g., semantic interpretation, on sounds or utterances that do not include a hotword.

A system may detect an utterance includes a hotword based on a hotword detection model. However, different users may pronounce the same hotword in different ways. Accordingly, the system may not detect when some users speak the hotword. The system may increase detection of hotwords based on generating individualized hotword detection models. However, generating a hotword detection model may use thousands of utterances and a user may not desire to provide thousands of enrollment utterances. Accordingly, after receiving one or more enrollment utterances by a user, the system may identify other utterances of the hotword by other users, select the utterances that are similar to the enrollment utterances by the user, and generate the individualized hotword detection model using the selected utterances and the enrollment utterances.

In some aspects, the subject matter described in this specification may be embodied in methods that may include the actions of obtaining enrollment acoustic data representing an enrollment utterance spoken by a user, obtaining a set of candidate acoustic data representing utterances spoken by other users, determining, for each candidate acoustic data of the set of candidate acoustic data, a similarity score that represents a similarity between the enrollment acoustic data and the candidate acoustic data, selecting a subset of candidate acoustic data from the set of candidate acoustic data based at least on the similarity scores, generating a detection model based on the subset of candidate acoustic data, and providing the detection model for use in detecting an utterance spoken by the user.

Other versions include corresponding systems, apparatus, and computer programs, configured to perform the actions of the methods, encoded on computer storage devices.

These and other versions may each optionally include one or more of the following features. For instance, in some implementations obtaining enrollment acoustic data representing an enrollment utterance spoken by a user includes obtaining enrollment acoustic data for multiple utterances of a predetermined phrase spoken by the user.

In certain aspects, obtaining a set of candidate acoustic data representing utterances spoken by other users includes determining the enrollment utterance is of a predetermined phrase and identifying candidate acoustic data representing utterances of the predetermined phrase spoken by other users.

In some aspects, determining, for each candidate acoustic data of the set of candidate acoustic data, the similarity score includes determining a distance between the enrollment acoustic data and the candidate acoustic data and determining the similarity score based on the distance.

In some implementations, determining, for each candidate acoustic data of the set of candidate acoustic data, the similarity score includes determining the similarity scores based on demographic information of the other user that spoke the utterance represented by the candidate acoustic data and demographic information of the user that spoke the enrollment utterance.

In certain aspects, selecting a subset of candidate acoustic data from the set of candidate acoustic data based at least on similarity scores of the candidate acoustic data that represent a similarity between the enrollment acoustic data and the candidate acoustic data is based on selecting a predetermined number of candidate acoustic data.

In some aspects, generating a detection model based on the subset of candidate acoustic data includes training a neural network using the subset of candidate acoustic data. In some implementations, additional actions include detecting an utterance of a predetermined phrase using the detection model.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
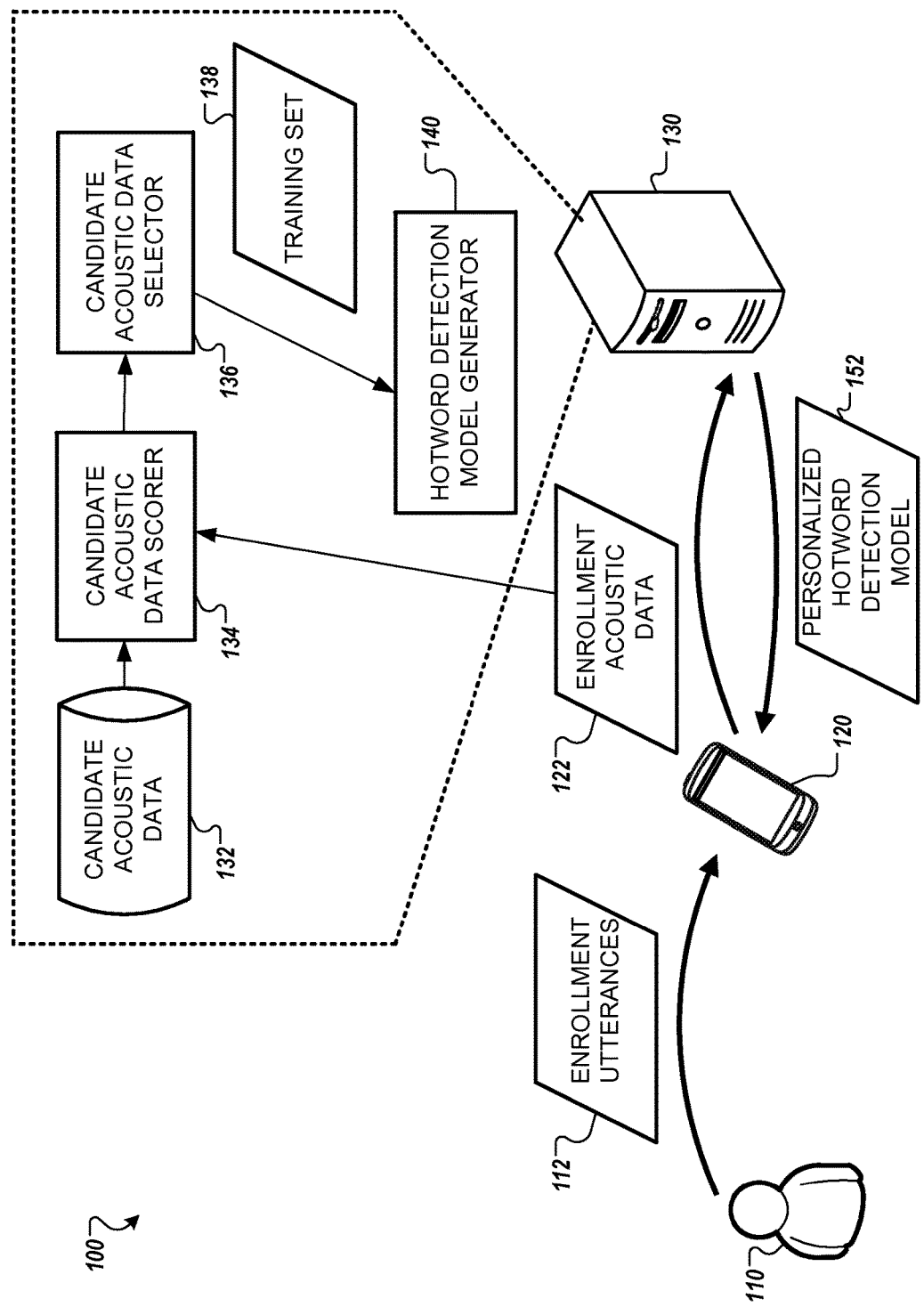
FIGS. 1 and 2 are illustrations of block diagrams of example systems for generating an individualized hotword detection model.

FIG. 1 is a block diagram of an example system 100 for generating an individualized hotword detection model.

Briefly, and as described in further detail below, the system 100 may include a client device 120 and a server 130 that includes a candidate acoustic data scorer 134, candidate acoustic data selector 136, and a hotword detection model generator 140.

The client device 120 may be a smart phone, a laptop computer, a tablet computer, a desktop computer, or some other computing device that is configured to detect when a user 110 says a hotword. For example, the client device 120 may be configured to detect when the user 110 says "OK COMPUTER."

The client device 120 may detect when the user 110 speaks a hotword using a hotword detection model. For example, the client device 120 may detect a user is speaking "OK COMPUTER" using a hotword detection model that has been trained to detect sounds corresponding to when the hotword, "OK COMPUTER," is spoken.

However, different users may pronounce the same hotword in different ways. For example, the user 110 may pronounce "OK COMPUTER" as "OK COM-UT-ER," and a hotword detection model may not detect "OK COM-UT-ER" as "OK COMPUTER." Accordingly, the client device 120 may increase detection of hotwords spoken by the user 110 based on a personalized hotword detection model 152 that is trained to detect when the user 110 says the hotword. For example, the personalized hotword detection model 152 may be trained to detect "OK COM-UT-ER" as a user's 110 pronunciation of the hotword "OK COMPUTER."

To obtain the personalized hotword detection model 152, the client device 120 may prompt the user to provide enrollment utterances. For example, for obtaining a personalized hotword detection model for detecting the hotword "OK COMPUTER," the client device 120 may provide the prompt "NOW PERSONALIZING HOTWORD DETECTION, SAY 'OK COMPUTER' THREE TIMES" to the user 110. The client device 120 may include an acoustic data generator that captures sound as acoustic data. For example, the client device 120 may include a microphone that captures the user 110 speaking "OK COMPUTER" as "OK COM-UT-ER" as signals, and encodes the signals as enrollment acoustic data 122 represented by mel-frequency cepstral coefficients.

The client device 120 may provide the enrollment acoustic data 122 to a server 130 and in response receive the personalized hotword detection model 152. For example, the client device 120 may provide enrollment acoustic data 122 representing the user 110 speaking "OK COMPUTER" as "OK COM-UT-ER" to the server 130, and in response, receive the personalized hotword detection model 152 trained based at least on the enrollment acoustic data.

The client device 120 may then detect when the user speaks the hotword using the personalized hotword detection model 152. For example, using the personalized hotword detection model 152 trained based on the enrollment acoustic data 122 representing the user 110 speaking "OK COMPUTER" as "OK COM-UT-ER," the client device 120 may detect the user 110 is saying the hotword "OK COMPUTER" when the user says "OK COM-UT-ER."

The server 130 may be configured to generate a personalized hotword detection model based on enrollment acoustic data. For example, the server 130 may receive the enrollment acoustic data 122 representing the user 110 speaking "OK COMPUTER" as "OK COM-UT-ER" and train the personalized hotword detection model 152 based at least on the enrollment acoustic data.

However, generating a hotword detection model may use thousands of utterances and a user may not want to personally provide thousands of enrollment utterances. Accordingly, after receiving one or more enrollment utterances by a user, the server 130 may identify other utterances of the hotword by other users, select the utterances that are similar to the enrollment utterances by the user, and generate the personalized hotword detection model 152 using the selected utterances and the enrollment utterances.

In more detail, the candidate acoustic database 132 of the server 130 may store acoustic data representing utterances of various users. For example, the candidate acoustic database 132 of the server 130 may store acoustic data representing hundreds of thousands of utterances of different users. The candidate acoustic database 132 may store each acoustic data with data that indicates the hotword that was uttered. For example, the candidate acoustic database 132 may store fifty thousand sets of acoustic data labeled as being an utterance of the hotword "OK COMPUTER" and fifty thousand sets of acoustic data labeled as being an utterance of a different hotword "MY BUTLER." In some implementations, the candidate acoustic database 132 may associate the acoustic data with demographic data that describes a user. For example, the candidate acoustic database 132 may associate the acoustic data with a location that the user was in when the hotword was spoken by the user. In another example, the candidate acoustic database 132 may associate the acoustic data with a gender of the user, an age range of the user, or some other information describing the user.

The candidate acoustic data scorer 134 of the server 130 may be configured to obtain the enrollment acoustic data 122 and the candidate acoustic data from the candidate acoustic database 132 and generate a similarity score that represents a similarity between the enrollment acoustic data 122 and the candidate acoustic data. For example, the candidate acoustic data scorer 134 may receive enrollment acoustic data 122 of the user saying "OK COMPUTER" and candidate acoustic data representing another user saying "OK COMPUTER," determine a 90% similarity, and associate a score of 0.9 with the candidate acoustic data. In the example, the candidate acoustic data scorer 134 may then obtain a second set of candidate acoustic data representing yet another user saying "OK COMPUTER," determine a 30% similarity with the enrollment acoustic data 122, and associate a score of 0.3 with the second set of candidate acoustic data.

The similarity score of a candidate acoustic data representing a particular utterance may reflect an acoustic similarity between the particular utterance and an enrollment utterance. For example, the similarity score may range from 0 to 1 where higher similarity scores reflect greater acoustic similarity and lower scores reflect lower acoustic similarity. In other examples other types of scores and ranges may be used, e.g., 1-5, A-F, or 0%-100%.

The candidate acoustic data scorer 134 may generate the score based on a distance between the enrollment acoustic data and the candidate acoustic data. For example, the candidate acoustic data scorer 134 may aggregate a difference between mel-frequency cepstral coefficients of the enrollment acoustic data and the candidate acoustic data across multiple frames, and determine a similarity score where greater aggregate distances result in scores that reflect less similarity and lower aggregate distances result in scores that reflect more similarity.

In some implementations, the candidate acoustic data scorer 134 may determine the score based on demographic information of the other user. For example, instead of selecting candidate acoustic data representing utterances of a user with the same gender, the candidate acoustic data scorer 134 may obtain candidate acoustic data representing utterances of users of different genders, determine whether the gender of a user speaking the utterance represented by the candidate acoustic data matches the gender of the user 110, and in response to determining a match, assigning a higher similarity score to candidate acoustic data representing utterances of users of the same gender as the user 110.

In some implementations, the candidate acoustic data scorer 134 may select candidate acoustic data from among more candidate acoustic data stored in the candidate acoustic database 132. For example, the candidate acoustic data scorer 134 may select to receive the acoustic data from the candidate acoustic database 132 where the hotword "OK COMPUTER" is spoken. The candidate acoustic data scorer 134 may obtain, with the enrollment acoustic data, one or more of an indication of the hotword spoken or an indication of the type of user saying the hotword, and query the candidate acoustic database 132 for acoustic data of users saying the same hotword or a similar type of user to the user saying the hotword. For example, the candidate acoustic data scorer 134 may obtain an indication that the hotword "OK COMPUTER" was spoken by a female user, and in response, query the candidate acoustic database 132 for acoustic data representing the hotword "OK COMPUTER" being spoken by a female user.

The candidate acoustic data selector 136 may obtain the scored candidate acoustic data from the candidate acoustic data scorer 134 and the enrollment acoustic data 122, and generate a training set 138 of acoustic data for training the personalized hotword detection model 152. For example, the candidate acoustic data selector 136 may obtain enrollment acoustic data representing the user 110 speaking "OK COMPUTER" and obtain fifty thousand of candidate acoustic data representing different other users saying "OK COMPUTER," where each of the candidate acoustic data is associated with a similarity score reflecting a similarity between the candidate acoustic data and the enrollment acoustic data 122, and generate a training set of acoustic data including ten thousand of the fifty thousand candidate acoustic data and the enrollment acoustic data 122.

The candidate acoustic data selector 136 may generate the training set 138 based on selecting a subset of the candidate acoustic data based at least on the similarity scores. For example, the candidate acoustic data selector 136 may obtain a set of fifty thousand candidate acoustic data and select a subset of ten thousand candidate acoustic data of the set with similarity scores that reflect higher similarities between the candidate acoustic data and the enrollment acoustic data 122 than the other candidate acoustic data.

The candidate acoustic data selector 136 may select the subset of candidate acoustic data based on selecting a predetermined number, e.g., one thousand, three thousand, ten thousand, fifty thousand, of candidate acoustic data. For example, the candidate acoustic data selector 136 may obtain enrollment acoustic data representing a single utterance of "OK COMPUTER," and select a subset of three thousand candidate acoustic data with similarity scores that reflect a higher similarity between the candidate acoustic data and the enrollment acoustic data.

Additionally or alternatively, the candidate acoustic data selector 136 may select a subset of candidate acoustic data based on selecting candidate acoustic data that satisfies a threshold similarity score. For example, the candidate acoustic data selector 136 may select candidate acoustic data with similarity scores above a threshold similarity score of 0.8, 0.85, 0.9 from a score range of 0.0-1.0, and include the selected candidate acoustic data in the training set 138.

In some implementations, the candidate acoustic data selector 136 may weight the acoustic data in the training set 138. For example, the candidate acoustic data selector 136 may include an enrollment acoustic data multiple times in the training set 138 or associate the enrollment acoustic data in the training set 138 with a greater weight than candidate acoustic data.

In some implementations, the candidate acoustic data selector 136 may select the subset of candidate acoustic data based on multiple enrollment acoustic data. For example, the candidate acoustic data selector 136 may receive enrollment acoustic data for three utterances of "OK COMPUTER" by the user 110, and for each enrollment acoustic data, select three thousand of the candidate acoustic data with similarity scores that reflect the most similarity to include in the training set 138. Accordingly, some candidate acoustic data may appear in the training set 138 multiple times if the candidate acoustic data is selected for multiple enrollment acoustic data. In some implementations, the candidate acoustic data selector 136 may remove duplicate candidate acoustic data from the training set 138 or prevent duplicate candidate acoustic data from being included in the training set 138.

In some implementations, the candidate acoustic data selector 136 may determine the number of candidate acoustic data to select for an enrollment acoustic data based on a number of enrollment acoustic data received by the candidate acoustic data selector 136. For example, the candidate acoustic data selector 136 may receive five enrollment acoustic data, determine that the hotword detection model generator should receive at a training set of least ten thousand acoustic data, and in response, for each enrollment acoustic data received, select at least one thousand nine hundred ninety nine candidate acoustic data to include in the training set with the enrollment acoustic data. In another example, the candidate acoustic data selector 136 may receive ten enrollment acoustic data, determine that the hotword detection model generator should receive at a training set of least ten thousand acoustic data, and in response, for each enrollment acoustic data received, select at least nine hundred ninety nine candidate acoustic data to include in the training set with the enrollment acoustic data.

In another example, the candidate acoustic data selector 136 may determine a similarity score for the candidate acoustic data based on determining sub-similarity scores for each of multiple enrollment acoustic data. For example, the candidate acoustic data selector 136 may receive three enrollment acoustic data, and for each candidate acoustic data, determine three sub-similarity scores each corresponding to one of the enrollment acoustic data, and determine the similarity score based on averaging the sub-similarity scores. In yet another example, the candidate acoustic data selector may take a median, floor, or ceiling of sub-similarity scores for a candidate acoustic data as the similarity score.

The hotword detection model generator 140 may receive the training set 138 from the candidate acoustic data selector 136 and generate a personalized hotword detection model 152. For example, the hotword detection model generator 140 may receive a training set including nine thousand nine hundred and ninety seven selected candidate acoustic data and three enrollment acoustic data, and generate a personalized hotword detection model 152 based on the training set.

The hotword detection model generator 140 may generate the personalized hotword detection model 152 based on training a neural network to detect the acoustic data in the training set 138 as representing utterances of the hotword.

For example, the hotword detection model generator 140 may generate the personalized hotword detection model 152 that detects the hotword "OK COMPUTER" based on the acoustic data in the training set 138.

Different configurations of the system 100 may be used where functionality of the client device 120 and the server 130 that includes the candidate acoustic data scorer 134, the candidate acoustic data selector 136, and the hotword detection model generator 140 may be combined, further separated, distributed, or interchanged. The system 100 may be implemented in a single device or distributed across multiple devices.

Figure 2:
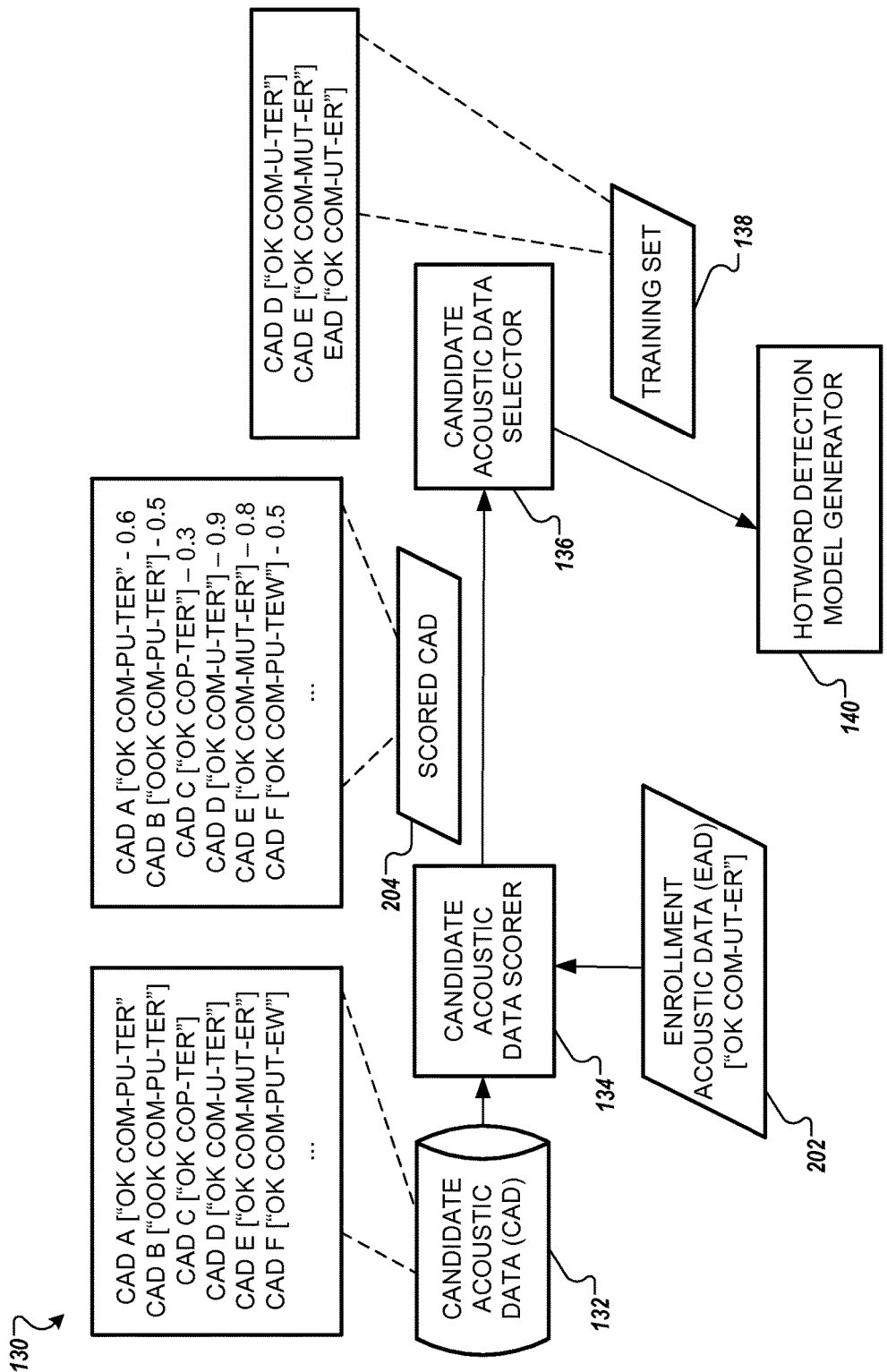

FIG. 2 is a block diagram of example server 130 for generating an individualized hotword detection model. The server 130 may be the server described in FIG. 1. As described above, the server 130 may include the candidate acoustic database 132, the candidate acoustic data scorer 134, the candidate acoustic data selector 136, and the hotword detection model generator 140.

The candidate acoustic database 132 may include multiple candidate acoustic data of various users saying the hotword "OK COMPUTER." For example, the candidate acoustic database 132 may include a candidate acoustic data of "User A" saying "OK COMPUTER" as "OK COM-PU-TER," a candidate acoustic data of "User B" saying "OK COM-PUTER" as "OOK COM-PU-TER", a candidate acoustic data of "User C" saying "OK COMPUTER" as "OK COP-TER," a candidate acoustic data of "User D" saying "OK COMPUTER" as "OK COM-U-TER," a candidate acoustic data of "User E" saying "OK COMPUTER" as "OK COM-MUT-ER," a candidate acoustic data of "User F" saying "OK COMPUTER" as "OK COM-PUT-EW," and other candidate acoustic data of other users saying "OK COMPUTER."

The candidate acoustic data scorer 134 may receive enrollment acoustic data 202 of a user and obtain a set of candidate acoustic data from the candidate acoustic database 132. For example, the candidate acoustic data scorer 134 may receive enrollment acoustic data 202 of the user saying "OK COMPUTER" as "OK COM-UT-ER," and in response, obtain a set of candidate acoustic data from the candidate acoustic database 132 including the candidate acoustic data of "User A" saying "OK COMPUTER" as "OK COM-PU-TER," the candidate acoustic data of "User B" saying "OK COMPUTER" as "OOK COM-PU-TER", the candidate acoustic data of "User C" saying "OK COM-PUTER" as "OK COP-TER," the candidate acoustic data of "User D" saying "OK COMPUTER" as "OK COM-U-TER," the candidate acoustic data of "User E" saying "OK COMPUTER" as "OK COM-MUT-ER," the candidate acoustic data of "User F" saying "OK COMPUTER" as "OK COM-PUT-EW," and the other candidate acoustic data of other users saying "OK COMPUTER."

The candidate acoustic data scorer 134 may generate similarity scores for each of the set of candidate acoustic data. For example, for an enrollment acoustic data of the user 110 saying "OK COMPUTER" as "OK COM-UT-ER," the candidate acoustic data scorer 134 may generate a similarity score of 0.6 reflecting a moderate similarity for candidate acoustic data of "User A" saying "OK COM-PUTER" as "OK COM-PU-TER," a similarity score of 0.5 reflecting a moderate similarity for candidate acoustic data of "User B" saying "OK COMPUTER" as "OOK COM-PU-TER", a similarity score of 0.3 reflecting a low similarity for candidate acoustic data of "User C" saying "OK COMPUTER" as "OK COP-TER," a similarity score of 0.9 reflecting a high similarity for candidate acoustic data of "User D" saying "OK COMPUTER" as "OK COM-U-TER," a similarity score of 0.8 reflecting a high similarity for candidate acoustic data of "User E" saying "OK COM-PUTER" as "OK COM-MUT-ER," and a similarity score of 0.5 reflecting a moderate similarity for candidate acoustic data of "User F" saying "OK COMPUTER" as "OK COM-PUT-EW."

The candidate acoustic data selector 136 may receive the scored candidate acoustic data 204 from the candidate acoustic data scorer 134 and generate the training set 138 of acoustic data. For example, the candidate acoustic data selector 136 may receive a similarity score of 0.6 reflecting a moderate similarity for candidate acoustic data of "User A" saying "OK COMPUTER" as "OK COM-PU-TER," a similarity score of 0.5 reflecting a moderate similarity for candidate acoustic data of "User B" saying "OK COM-PUTER" as "OOK COM-PU-TER", a similarity score of 0.3 reflecting a low similarity for candidate acoustic data of "User C" saying "OK COMPUTER" as "OK COP-TER," a similarity score of 0.9 reflecting a high similarity for candidate acoustic data of "User D" saying "OK COMPUTER" as "OK COM-U-TER," a similarity score of 0.8 reflecting a high similarity for candidate acoustic data of "User E" saying "OK COMPUTER" as "OK COM-MUT-ER," a similarity score of 0.5 reflecting a moderate similarity for candidate acoustic data of "User F" saying "OK COM-PUTER" as "OK COM-PUT-EW," the corresponding candidate acoustic data, and the enrollment acoustic data, and in response may generate a training set of acoustic data including the candidate acoustic data of "User D" saying "OK COMPUTER" as "OK COM-U-TER," the candidate acoustic data of "User E" saying "OK COMPUTER" as "OK COM-MUT-ER," and the enrollment acoustic data of the user saying "OK COMPUTER" as "OK COM-UT-ER."

The candidate acoustic data selector 136 may generate the training set by selecting a subset of the set of candidate acoustic data based on the similarity scores. For example, the candidate acoustic data selector 136 may determine that the hotword detection model generator should receive a training set of three acoustic data, determine there is one enrollment acoustic data, determine to select two candidate acoustic data to obtain three total acoustic data, and select the candidate acoustic data with the similarity scores of 0.9 and 0.8 that reflect the greatest similarity with the enrollment acoustic data out of all of the candidate acoustic data.

The hotword detection model generator 140 may receive the training set 138 and generate a personalized hotword detection model 152. For example, the hotword detection model generator 140 may receive a training set including the candidate acoustic data of "User D" saying "OK COM-PUTER" as "OK COM-U-TER," the candidate acoustic data of "User E" saying "OK COMPUTER" as "OK COM-MUT-ER," and the enrollment acoustic data of the user saying "OK COMPUTER" as "OK COM-UT-ER," and train a neural network to detect those acoustic data as representing the hotword "OK COMPUTER" being spoken by the user 110.

Figure 3:
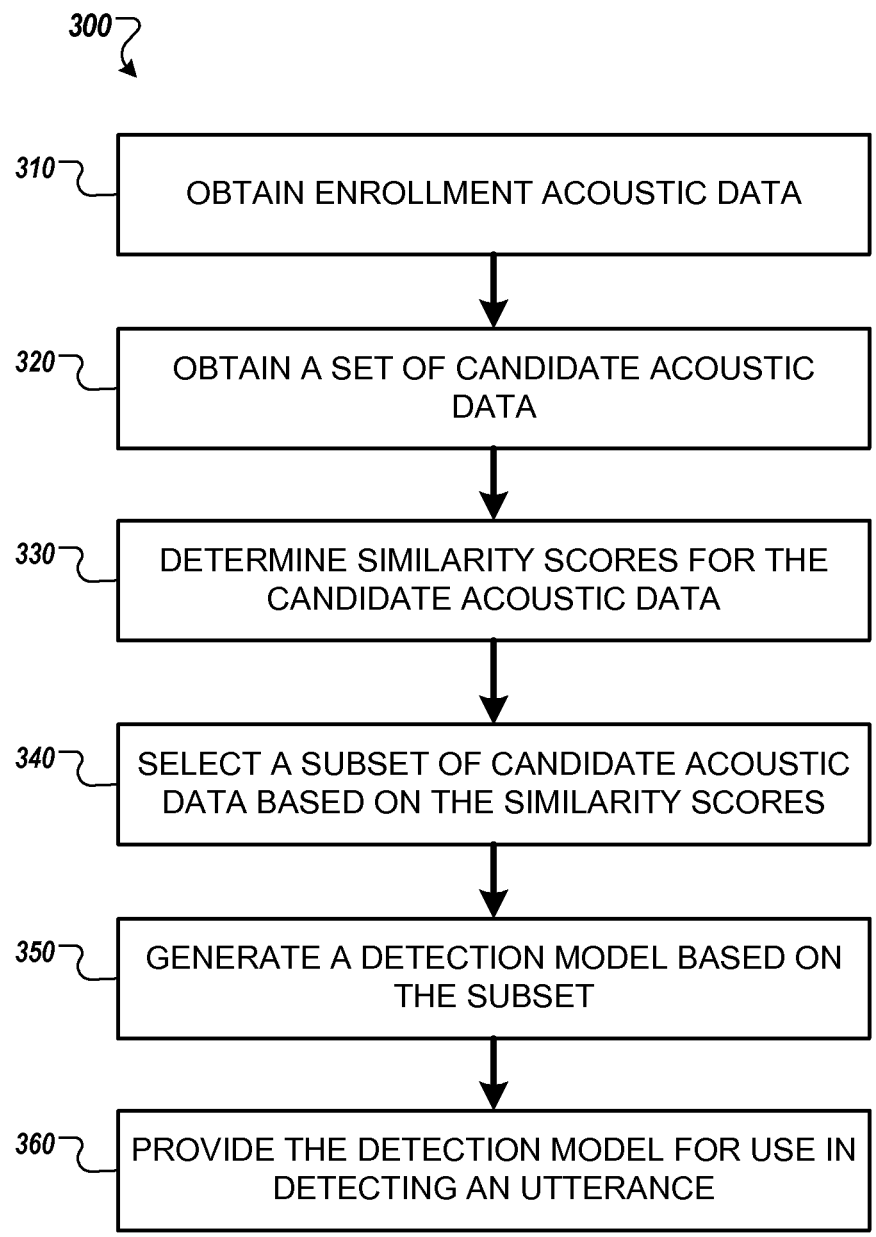
FIG. 3 is a flowchart of an example process for generating an individualized hotword detection model.

FIG. 3 is a flowchart of an example process for generating an individualized hotword detection model. The following describes the processing 300 as being performed by components of the systems 100 that are described with reference to FIG. 1. However, the process 300 may be performed by other systems or system configurations.

The process 300 may include obtaining enrollment acoustic data representing an enrollment utterance spoken by a user (310). For example, the candidate acoustic data scorer 134 may obtain enrollment acoustic data from the client device 120 representing the user saying a hotword, "MY BUTLER," after being prompted by the client device 120 to provide a sample enrollment utterance for training the client device 120 to detect when the user says the hotword, "MY BUTLER."

The process 300 may include obtaining a set of candidate acoustic data representing utterances spoken by other users (320). For example, the candidate acoustic data scorer 134 may determine that the enrollment acoustic data is for the hotword, "MY BUTLER," spoken by a male between the ages of twenty to thirty, and in response, obtain, from the candidate acoustic database 132, candidate acoustic data representing other male users between the ages of twenty to thirty saying the hotword, "MY BUTLER."

The process may include determining, for each candidate acoustic data of the set of candidate acoustic data, a similarity score that represents a similarity between the enrollment acoustic data and the candidate acoustic data (330). For example, for each candidate acoustic data obtained from the candidate acoustic database 132, the candidate acoustic data scorer 134 may determine enrollment acoustic data representing the user saying the hotword, "MY BUTLER," and the candidate acoustic data representing another user saying the hotword, "MY BUTLER."

The process may include selecting a subset of candidate acoustic data from the set of candidate acoustic data based at least on the similarity scores (340). For example, the candidate acoustic data selector 136 may select a predetermined number, e.g., one thousand, five thousand, twenty thousand, or some other number, of candidate acoustic data with the similarity scores that reflect the most similarity with the enrollment acoustic data. In another example, the candidate acoustic data selector 136 may select candidate acoustic data with similarity scores that satisfy a threshold similarity score, e.g., 0.7, 0.8, 0.9, or some other amount.

The process may include generating a detection model based on the subset of candidate acoustic data (350). For example, the hotword detection model generator 140 may generate the personalized hotword detection model based on training a neural network to detect when the user speaks the hotword, "MY BUTLER," using the selected candidate acoustic data of other users saying "MY BUTLER."

The process may include providing the detection model for use in detecting an utterance spoken by the user (360). For example, the server 130 may provide the personalized hotword detection model 152 generated by the hotword detection model generator 140 to the client device 120. The client device 120 may then use the personalized hotword detection model 152 for detecting when the user 110 says the hotword, "MY BUTLER."

Figure 4:
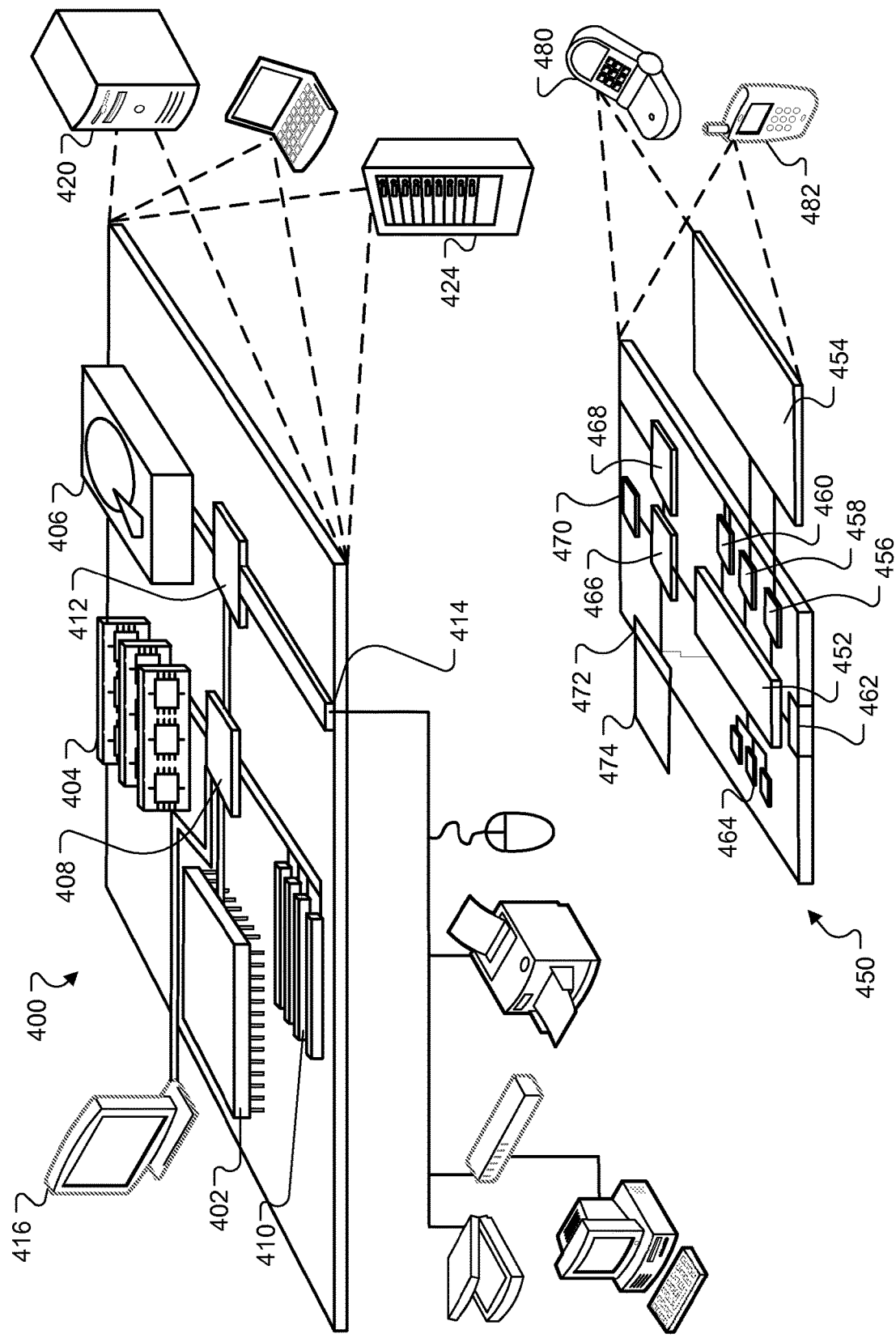
FIG. 4 is a diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile computing devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile computing device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
obtaining enrollment acoustic data for a user representing an utterance of a particular, predefined hotword that was spoken by the user during an enrollment process associated with a mobile device;
obtaining a set of candidate acoustic data representing utterances of the same, particular predefined hotword that were previously-spoken by other users;
after receiving the enrollment acoustic data, selecting, from the set of candidate acoustic data, a subset of the candidate acoustic data that is acoustically similar to the enrollment acoustic data;
training a neural network-based, hotword detection model to generate a neural network-based, hotword detection model that is customized for the user, wherein the training uses (1) the enrollment acoustic data for the user and (2) the selected subset of the candidate acoustic data that is acoustically similar to the enrollment acoustic data as examples of acceptable utterances of the particular, predefined hotword for the user; and
providing the neural network-based, hotword detection model that is customized for the user for use in detecting an utterance of the particular, predefined hotword that is subsequently spoken by the user.

2. The method of claim 1, wherein obtaining enrollment acoustic data representing an utterance of a particular, predefined hotword that was spoken by a user during an enrollment process associated with a mobile device comprises:
obtaining enrollment acoustic data for multiple utterances of the particular, predefined hotword spoken by the user.

3. The method of claim 1, wherein obtaining a set of candidate acoustic data representing utterances of the same, particular, predefined hotword that was previously spoken by other users comprises:
determining the utterance is of the particular, predefined hotword; and
identifying candidate acoustic data representing utterances of the particular, predefined hotword spoken by other users.

4. The method of claim 1, wherein selecting, from the set of candidate acoustic data, a subset of the candidate acoustic data that is acoustically similar to the enrollment acoustic data comprises determining, for each candidate acoustic data of the set of candidate acoustic data, that a similarity score that represents a similarity between the enrollment acoustic data and the candidate acoustic data satisfies a similarity threshold, comprising:
determining an acoustic distance between the enrollment acoustic data and the candidate acoustic data; and
determining the similarity score based on the acoustic distance.

5. The method of claim 1, wherein selecting, from the set of candidate acoustic data, a subset of the candidate acoustic data that is acoustically similar to the enrollment acoustic data comprises:
determining similarity scores for the candidate acoustic data based on (i) demographic information of the other user that spoke the utterance represented by the candidate acoustic data, including a gender of the other user and (ii) demographic information of the user that spoke the utterance represented by the enrollment acoustic data, including a gender of the user that spoke the utterance represented by the enrollment acoustic data; and
selecting the subset of the candidate acoustic data based at least in part on the similarity scores.

6. The method of claim 1, wherein selecting a subset of acoustically similar, candidate acoustic data from the set of candidate acoustic data includes selecting a predetermined number of candidate acoustic data.

7. The method of claim 1, further comprising:
detecting an utterance of the particular, predefined hotword using the neural network-based, hotword detection model that is customized for the user.

8. The method of claim 1, wherein providing the neural network-based, hotword detection model that is customized for the user comprises providing the neural network-based, hotword detection model that is customized for the user to a client device associated with the user.

9. The method of claim 8, wherein providing the neural network-based, hotword detection model that is customized for the user to the client device associated with the user comprises providing, over a communication network, the neural network-based, hotword detection model that is customized for the user to a client device that provided the enrollment acoustic data for the user.

10. The method of claim 1, wherein the selecting and training are performed in response to obtaining the enrollment acoustic data for the user, and wherein the selected subset of the candidate acoustic data is a proper subset of the candidate acoustic data;
wherein selecting the subset of the candidate acoustic data comprises selecting each particular candidate acoustic data of the subset based on determining that a similarity score that represents an acoustic similarity between the enrollment acoustic data and the particular candidate acoustic data exceeds a threshold similarity score; and
wherein training the neural network-based, hotword detection model to generate the neural network-based, hotword detection model that is customized for the user comprises:
training the neural network-based, hotword detection model to detect both (1) the enrollment acoustic data for the user and (2) the selected subset of the candidate acoustic data as valid instances of the particular, predefined hotword for the user even though the neural network-based, hotword detection model generated through the training is customized for accepting utterances of the hotword by the user and the selected subset of the candidate acoustic data represents utterances of other users that are different from the user.

11. The method of claim 1, wherein selecting, from the set of candidate acoustic data, a subset of the candidate acoustic data that is acoustically similar to the enrollment acoustic data comprises:
  determining similarity scores for the candidate acoustic data based on (i) demographic information of the other user that spoke the utterance represented by the candidate acoustic data, including a location of the other user and (ii) demographic information of the user that spoke the utterance represented by the enrollment acoustic data, including a location of the user that spoke the utterance represented by the enrollment acoustic data; and
  selecting the subset of the candidate acoustic data based at least in part on the similarity scores.

12. A system comprising:
  one or more computers; and
  one or more storage devices storing instructions that are operable, when executed by the one or more computers, to cause the one or more computers to perform operations comprising:
    obtaining enrollment acoustic data for a user representing an utterance of a particular, predefined hotword that was spoken by the user during an enrollment process associated with a mobile device;
    obtaining a set of candidate acoustic data representing utterances of the same, particular predefined hotword that were previously-spoken by other users;
    after receiving the enrollment acoustic data, selecting, from the set of candidate acoustic data, a subset of the candidate acoustic data that is acoustically similar to the enrollment acoustic data;
    training a neural network-based, hotword detection model to generate a neural network-based, hotword detection model that is customized for the user, wherein the training uses (1) the enrollment acoustic data for the user and (2) the selected subset of the candidate acoustic data that is acoustically similar to the enrollment acoustic data as examples of acceptable utterances of the particular, predefined hotword for the user; and
    providing the neural network-based, hotword detection model that is customized for the user for use in detecting an utterance of the particular, predefined hotword that is subsequently spoken by the user.

13. The system of claim 12, wherein obtaining enrollment acoustic data representing an utterance of a particular, predefined hotword that was spoken by a user during an enrollment process associated with a mobile device comprises:
  obtaining enrollment acoustic data for multiple utterances of the particular, predefined hotword spoken by the user.

14. The system of claim 12, wherein obtaining a set of candidate acoustic data representing utterances of the same, particular, predefined hotword that was previously spoken by other users comprises:
  determining the utterance is of the particular, predefined hotword; and
  identifying candidate acoustic data representing utterances of the particular, predefined hotword spoken by other users.

15. The system of claim 12, wherein selecting, from the set of candidate acoustic data, a subset of the candidate acoustic data that is acoustically similar to the enrollment acoustic data comprises determining, for each candidate acoustic data of the set of candidate acoustic data, that a similarity score that represents a similarity between the enrollment acoustic data and the candidate acoustic data satisfies a similarity threshold, comprising:
  determining an acoustic distance between the enrollment acoustic data and the candidate acoustic data; and
  determining the similarity score based on the acoustic distance.

16. The system of claim 12, wherein selecting, from the set of candidate acoustic data, a subset of the candidate acoustic data that is acoustically similar to the enrollment acoustic data comprises:
  determining similarity scores for the candidate acoustic data based on (i) demographic information of the other user that spoke the utterance represented by the candidate acoustic data, including an age of the other user and (ii) demographic information of the user that spoke the utterance represented by the enrollment acoustic data, including an age of the user that spoke the utterance represented by the enrollment acoustic data; and
  selecting the subset of the candidate acoustic data based at least in part on the similarity scores.

17. The system of claim 12, the operations further comprising:
  detecting an utterance of the particular, predefined hotword using the neural network-based, hotword detection model.

18. One or more non-transitory computer-readable media storing instructions executable by one or more computers which, upon such execution, cause the one or more computers to perform operations comprising:
  obtaining enrollment acoustic data for a user representing an utterance of a particular, predefined hotword that was spoken by the user during an enrollment process associated with a mobile device;
  obtaining a set of candidate acoustic data representing utterances of the same, particular predefined hotword that were previously-spoken by other users;
  after receiving the enrollment acoustic data, selecting, from the set of candidate acoustic data, a subset of the candidate acoustic data that is acoustically similar to the enrollment acoustic data;
  training a neural network-based, hotword detection model to generate a neural network-based, hotword detection model that is customized for the user, wherein the training uses (1) the enrollment acoustic data for the user and (2) the selected subset of the candidate acoustic data that is acoustically similar to the enrollment acoustic data as examples of acceptable utterances of the particular, predefined hotword for the user; and
  providing the neural network-based, hotword detection model that is customized for the user for use in detecting an utterance of the particular, predefined hotword that is subsequently spoken by the user.

19. The one or more non-transitory computer-readable media of claim 18, wherein obtaining enrollment acoustic data representing an utterance of a particular, predefined hotword that was spoken by a user during an enrollment process associated with a mobile device comprises:
  obtaining enrollment acoustic data for multiple utterances of the particular, predefined hotword spoken by the user.

20. The one or more non-transitory computer-readable media of claim 18, wherein obtaining a set of candidate acoustic data representing utterances of the same, particular, predefined hotword that was previously spoken by other users comprises:

determining the utterance is of the particular, predefined hotword; and identifying candidate acoustic data representing utterances of the particular, predefined hotword spoken by other users.

\* \* \* \* \*